United States Patent
Muramatsu

(10) Patent No.: US 8,900,765 B2
(45) Date of Patent: Dec. 2, 2014

(54) FUEL CELL SYSTEM CAPABLE OF REDUCING DETERIORATION OF FUEL CELL

(75) Inventor: Yasuyuki Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 611 days.

(21) Appl. No.: 12/429,273

(22) Filed: Apr. 24, 2009

(65) Prior Publication Data

US 2009/0269635 A1   Oct. 29, 2009

(30) Foreign Application Priority Data

Apr. 25, 2008   (JP) .................................. 2008-116286

(51) Int. Cl.
*H01M 8/04*   (2006.01)
*H01M 8/10*   (2006.01)

(52) U.S. Cl.
CPC ...... *H01M 8/04298* (2013.01); *H01M 8/04328* (2013.01); *H01M 8/04343* (2013.01); *H01M 8/04365* (2013.01); *H01M 8/04373* (2013.01); *H01M 8/0444* (2013.01); *H01M 8/04492* (2013.01); *H01M 8/04559* (2013.01); *H01M 8/04589* (2013.01); *H01M 8/04626* (2013.01); *H01M 8/0494* (2013.01); *H01M 8/04955* (2013.01); *H01M 8/1011* (2013.01); *H01M 8/04007* (2013.01); *H01M 2250/20* (2013.01); *Y02E 60/523* (2013.01); *Y02T 90/32* (2013.01); *Y02E 60/522* (2013.01)
USPC ........... 429/428; 429/429; 429/425; 429/515; 429/400

(58) Field of Classification Search
CPC ...................................................... H01M 8/04
USPC ................. 429/429, 425, 447, 515, 428, 400
See application file for complete search history.

(56) References Cited

U.S. PATENT DOCUMENTS

| | | | |
|---|---|---|---|
| 5,348,225 A | 9/1994 | Hwang | |
| 6,158,537 A | 12/2000 | Nonobe | |
| 2003/0022037 A1* | 1/2003 | Parr et al. .................. | 429/22 |

(Continued)

FOREIGN PATENT DOCUMENTS

| | | |
|---|---|---|
| JP | 06-185790 A | 7/1994 |
| JP | 10-040931 A | 2/1998 |
| JP | 2000-071752 A | 3/2000 |
| JP | 2003-077510 A | 3/2003 |
| JP | 2004-079514 A | 3/2004 |

(Continued)

OTHER PUBLICATIONS

JP 2007-317552 Abstract.*

*Primary Examiner* — Patrick Ryan
*Assistant Examiner* — Alex Usyatinsky
(74) *Attorney, Agent, or Firm* — Keating & Bennett, LLP

(57) ABSTRACT

A fuel cell system which is capable of reducing deterioration of fuel cells includes a cell stack, a CPU, a voltage detection circuit, a current detection circuit, an external air temperature sensor, a humidity sensor, a concentration sensor and sonars. The CPU obtains a volume of a garage, an amount of temperature change, an amount of humidity change and an amount of methanol concentration change in external air, as well as an amount of output change in the cell stack based on detection results from the voltage detection circuit, the current detection circuit, the external air temperature sensor, the humidity sensor, the concentration sensor and the sonars. The CPU sets first through fifth duration times based on the volume of the garage and the various amounts of changes, selects the shortest duration time, and stops power generation in the cell stack when the selected duration time has passed.

12 Claims, 6 Drawing Sheets

(56) References Cited

U.S. PATENT DOCUMENTS

| | | | |
|---|---|---|---|
| 2003/0044660 A1 | 3/2003 | Motoyama et al. | |
| 2006/0161345 A1 | 7/2006 | Mishima et al. | |
| 2007/0095649 A1* | 5/2007 | Barlow | 204/176 |
| 2007/0231645 A1 | 10/2007 | Nagasaki | |
| 2007/0275272 A1 | 11/2007 | Muramatsu | |
| 2008/0032165 A1* | 2/2008 | Yamaguchi | 429/13 |
| 2008/0160368 A1* | 7/2008 | Muramatsu | 429/22 |
| 2008/0238355 A1* | 10/2008 | Muramatsu | 320/101 |
| 2010/0167098 A1* | 7/2010 | Furukawa et al. | 429/24 |

FOREIGN PATENT DOCUMENTS

| | | |
|---|---|---|
| JP | 2004-284722 A | 10/2004 |
| JP | 2006-073309 A | 3/2006 |
| JP | 2007-194082 A | 8/2007 |
| JP | 2007-220559 A | 8/2007 |
| JP | 2007-273388 A | 10/2007 |
| JP | 2007-317552 A | 12/2007 |
| JP | 2008-004432 A | 1/2008 |
| JP | 2008-004538 A | 1/2008 |
| JP | 2008-071572 A | 3/2008 |
| WO | WO 2006046684 A2 * | 5/2006 |

* cited by examiner

FUEL CELL SYSTEM CAPABLE OF REDUCING DETERIORATION OF FUEL CELL

BACKGROUND OF THE INVENTION

1. Field of the Invention

The present invention relates to fuel cell systems, and more specifically to a fuel cell system which includes fuel cells that generate power by using fuel and air that contains an oxidizer.

2. Description of the Related Art

Generally, as disclosed in JP-A 10-40931, for example, fuel cell systems which supply power to transportation equipment and electronic equipment continue their power generating operation in the fuel cells to charge their secondary battery even after the equipment operation has been shut down. The charging of the secondary battery as described secures electric power which will be necessary when the fuel cell system is started the next time; namely, the charge is utilized to sustain the fuel cell system until the system shifts to normal operation where constant power generation is possible.

Transportation equipment and electronic equipment are often stored in a closed space (a space having poor air exchange with the outside) such as a garage or case after their operation has been shut down.

If a fuel cell system is disposed in a closed space and continues power generation in its fuel cells, the amount of oxygen contained in the air in the closed space decreases, and it is likely that oxygen distribution in the fuel cells will become non-uniform. Specifically, while there is sufficient supply of oxygen on an upstream side of an air channel in the fuel cell cathode (air electrode), there may be a deficiency of oxygen on the downstream side. This is due to oxygen consumption in the electrochemical reactions, which decreases oxygen concentration in the air channel as the air comes more on the downstream side. Consequently, power generation is localized in a portion of the fuel cell where there is enough supply of oxygen. This causes an electric potential difference, i.e., an electric current flowing within the cathode, which will accelerate fuel cell deterioration. This problem can be serious especially in fuel cell systems that continue a power generating operation in the fuel cells to charge a secondary battery even after the equipment operation has been shut down, such as the fuel cell system disclosed in JP-A 10-40931. Since the user may be unaware that the secondary battery continues to be charged by the power generation of the fuel cell even after the equipment power source has been switched off, it is highly likely that the user will dispose the equipment in a closed space without being aware that the fuel cell system is still generating power. In other words, it is very likely that the fuel cell system is brought to such a situation as described above which will cause accelerated deterioration of the fuel cell.

SUMMARY OF THE INVENTION

In order to overcome the problems described above, preferred embodiments of the present invention provide a fuel cell system capable of reducing the fuel cell deterioration.

According to a preferred embodiment of the present invention, a fuel cell system includes a fuel cell arranged to generate electric power using a fuel and air which contains an oxidizer; a change information obtaining device arranged to obtain at least one kind of change information from temperature change information of the air used in the power generation of the fuel cell, humidity change information of the air, and output change information of the fuel cell; and a control device arranged to stop power generation in the fuel cell based on the change information obtained by the change information obtaining device.

In a preferred embodiment of the present invention, at least one kind of change information from temperature change information of air which is used for power generation in the fuel cell, humidity change information of the air and output change information of the fuel cell is preferably obtained. Since the fuel cell system discharges warm exhaust gas due to heat generation in the electrochemical reactions in the fuel cell, continued power generation by the fuel cell in the fuel cell system disposed in a closed space will raise the temperature of the air in the closed space (air which is to be used for power generation in the fuel cell). Also, since the exhaust gas from the fuel cell system is humidified by water which is produced in association with the electrochemical reactions in the fuel cell, continued power generation by the fuel cell in the fuel cell system disposed in a closed space will raise the humidity of the air in the closed space. Further, since the fuel cell consumes oxygen (an oxidizer) in the air in the process of power generation, continued power generation by the fuel cell in the fuel cell system disposed in a closed space will reduce oxygen in the air in the closed space, decreasing the output from the fuel cell. Such a temperature rise, a humidity rise and an output decrease show different changes from those changes which take place in a normal situation where the fuel cell system is not disposed in a closed space. Hence, it is possible to determine whether or not the fuel cell system is disposed in a closed space based on any one of the change information from temperature change information and humidity change information of the air which is to be used for power generation in the fuel cell and output change information of the fuel cell. Then, if it is determined that the fuel cell system is disposed in a closed space, power generation in the fuel cell is stopped. This arrangement makes it possible to stop power generation in the fuel cell before the fuel cell begins localized power generation due to decreased oxygen in the air in the closed space, and therefore makes it possible to reduce deterioration of the fuel cell.

It should be noted here that "air which is to be used for power generation in the fuel cell" means air around the fuel cell system or air which exists inside the fuel cell system but has not been supplied to the fuel cell yet.

Preferably, the change information obtaining device obtains at least one of an amount of temperature change in the air per predetermined time as the temperature change information, an amount of humidity change in the air per predetermined time as the humidity change information and an amount of output change in the fuel cell per predetermined time as the output change information. For example, at least one of a difference in the air temperature, a difference in the air humidity and a difference in the fuel cell output is obtained between a certain time point and a later time point, and at least one of an amount of temperature change, an amount of humidity change and an amount of output change per predetermined time is obtained as the change information. With such an arrangement as the above, it is easy to obtain the amount of change.

Further preferably, the control device stops power generation in the fuel cell if the amount of change is not smaller than a first threshold value. In this case, power generation in the fuel cell is stopped if one of the obtained amounts of change is not smaller than the first threshold value. The first threshold value which is compared to the amount of temperature change is set to a value which represents a maximum approximate amount of change presumed for a natural trend of temperature change of the air. If the obtained amount of temperature change is smaller than the first threshold value which is defined as the above, power generation in the fuel cell is continued. This makes it possible to stop power generation in the fuel cell based on a determination whether or not the fuel cell system is disposed in a closed space. The first threshold value which is compared to the amount of humidity change is set to a value which represents a maximum approximate amount of change presumed for a natural trend of humidity change of the air. If the obtained amount of humidity change is smaller than the first threshold value which is defined as the above, power generation in the fuel cell is continued. This makes it possible to stop power generation in the fuel cell based on a determination whether or not the fuel cell system is disposed in a closed space. The first threshold value which is compared to the amount of output change is set to a value which represents a maximum approximate amount of change presumed for a normal trend of output change. If the obtained amount of output change is smaller than the first threshold value which is defined as the above, power generation in the fuel cell is continued. This makes it possible to stop power generation in the fuel cell based on a determination whether or not the fuel cell system is disposed in a closed space. In other words, it is possible to prevent such a problem that power generation in the fuel cell is erroneously stopped even if there is only a low risk for accelerated deterioration of the fuel cell.

Further, preferably, the control device stops power generation in the fuel cell if the amount of change is not smaller than the first threshold value and is smaller than a second threshold value which is greater than the first threshold value. In this case, power generation in the fuel cell is stopped if one of the obtained amounts of change is not smaller than the first threshold value and smaller than the second threshold value. The second threshold value which is compared to the amount of temperature change is set to a value which is greater than a maximum amount of temperature change presumed by adjusting the first threshold value with a temperature rise caused by the exhaust gas. If the obtained amount of temperature change is not smaller than the second threshold value which is defined as the above, power generation in the fuel cell is continued. This makes it possible to prevent such a problem that power generation in the fuel cell is erroneously stopped when, for example, the fuel cell system was moved from outside into an indoor environment and the air temperature around the fuel cell system has been raised sharply but the temperature rise in the air which is to be used for power generation is not caused by power generation in the fuel cell. The second threshold value which is compared to the amount of humidity change is set to a value which is greater than a maximum amount of humidity change presumed by adjusting the first threshold value with a humidity rise caused by exhaust gas. If the obtained amount of humidity change is not smaller than the second threshold value which is defined as described above, power generation in the fuel cell is continued. This makes it possible to prevent such a problem that power generation in the fuel cell is erroneously stopped when, for example, the fuel cell system was moved from outside into an inside environment and the air humidity around the fuel cell system has been raised sharply but the humidity rise in the air which is to be used for power generation is not caused by power generation in the fuel cell. The second threshold value which is compared to the amount of output change is set to a value which is greater than a maximum amount of output change presumed by adjusting the first threshold value with an output drop caused by decrease in oxygen in the closed space. If the obtained amount of output change is not smaller than the second threshold value which is defined as the above, power generation in the fuel cell is continued. This makes it possible to prevent such a problem that power generation in the fuel cell is erroneously stopped when, for example, the output detector which detects the output of the fuel cell has made an erroneous detection that there is a sharp drop in the output of the fuel cell, but there is not such an output drop of the fuel cell actually in association with decrease in the amount of oxygen caused by the power generation. In other words, it is possible to prevent such a problem that power generation in the fuel cell is erroneously stopped even if there is only a low risk for accelerated deterioration of the fuel cell.

Preferably, the fuel cell system further includes a setting device arranged to set a duration time for continued power generation in the fuel cell based on the change information, and the control device stops power generation in the fuel cell upon a lapse of the duration time set by the setting device. In this case, even if it is determined that the fuel cell system is disposed in a closed space, a duration time which matches the size of the closed space is set based on any type of the change information and then, power generation in the fuel cell is stopped upon the lapse of the duration time. This makes it possible to continue power generation in the fuel cell within a range where there is no risk for accelerated deterioration even if the fuel cell system is disposed in a closed space.

Further preferably, the fuel cell system further includes a space information obtaining device arranged to obtain space information regarding a size of a space where the fuel cell system is disposed, and the control device stops power generation in the fuel cell based on the change information or the space information. In this case, it is possible to stop power generation in the fuel cell appropriately based on a more reliable piece of information, i.e., any of the change information or the space information regarding the size of the space. It is possible to reliably reduce deterioration of the fuel cell by stopping power generation in the fuel cell if a determination based on the space information is that fuel cell system is disposed in a small space.

Further, preferably, the control device stops power generation in the fuel cell based on the change information while an electric power source of the fuel cell system or of equipment to which the fuel cell system is connected is in an off state. When the power source is in an off state, the system is often unattended by the user, and it is sometimes impossible to prevent deterioration of the fuel cell by simply giving a warning. Hence, a preferred embodiment of the present invention is effective while the power source is turned off.

Preferably, the control device stops power generation in the fuel cell based on the change information while the fuel cell is in a normal operation. It is sometimes impossible to obtain accurate change information when the system is not in normal operation, and particularly, the output of the fuel cell is unstable when the system is not in normal operation. Erroneous determination can be prevented by an arrangement that determination is made only in normal operation.

Further preferably, the fuel cell system further includes a temperature detector arranged to detect information regarding a temperature of the fuel cell, and the control device stops power generation in the fuel cell based on the change information while a detection result of the temperature detector is not smaller than a predetermined value. In this case, the predetermined value is used as a threshold value to determine whether or not the fuel cell is in normal operation. This makes it easy to determine whether or not the fuel cell is in normal operation based on detection result from the temperature detector. Then, erroneous determination can be prevented by an arrangement that whether or not to stop power generation in the fuel cell is determined based on the change information only when the system is in normal operation.

Further, preferably, the fuel cell system further includes an output detector arranged to detect information regarding an output of the fuel cell, and the control device stops power generation in the fuel cell based on the change information while a detection result of the output detector is not smaller than a predetermined value. In this case, the predetermined value is used as a threshold value to determine whether or not the fuel cell is in normal operation. This makes it easy to determine whether or not the fuel cell is in normal operation based on detection result from the output detector. Then, erroneous determination can be prevented by an arrangement that whether or not to stop power generation in the fuel cell is determined based on the change information only when the system is in normal operation.

When a fuel cell system which uses a fuel that contains alcohol or ether is disposed in a closed space, humidity in the closed space is likely to increase since the exhaust gas from the fuel cell system contains a higher level of water vapor than exhaust gas from a hydrogen fuel cell system. Also, since the exhaust gas contains carbon dioxide, the air temperature in the closed space is also likely to increase, and the output of the fuel cell is likely to decrease. For these reasons, in a fuel cell system which uses a fuel that contains alcohol or ether, it is possible to obtain the change information accurately. Therefore, a preferred embodiment of the present invention is particularly effective in fuel cell systems which use a fuel that contains alcohol or ether.

Generally, transportation equipment has greater power consumption than electronic equipment such as personal computers, and therefore transportation equipment is mounted with a fuel cell system which includes large fuel cells of a high output capacity. In such large fuel cells, localized power generation and accelerated deterioration caused thereby are likely as the amount of oxygen in the air which is to be used for power generation decreases. Therefore, a preferred embodiment of the present invention can be suitably applied to transportation equipment which requires use of large fuel cells.

The above-described features, elements, characteristics, aspects and advantages of the present invention will become clearer from the following detailed description of preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
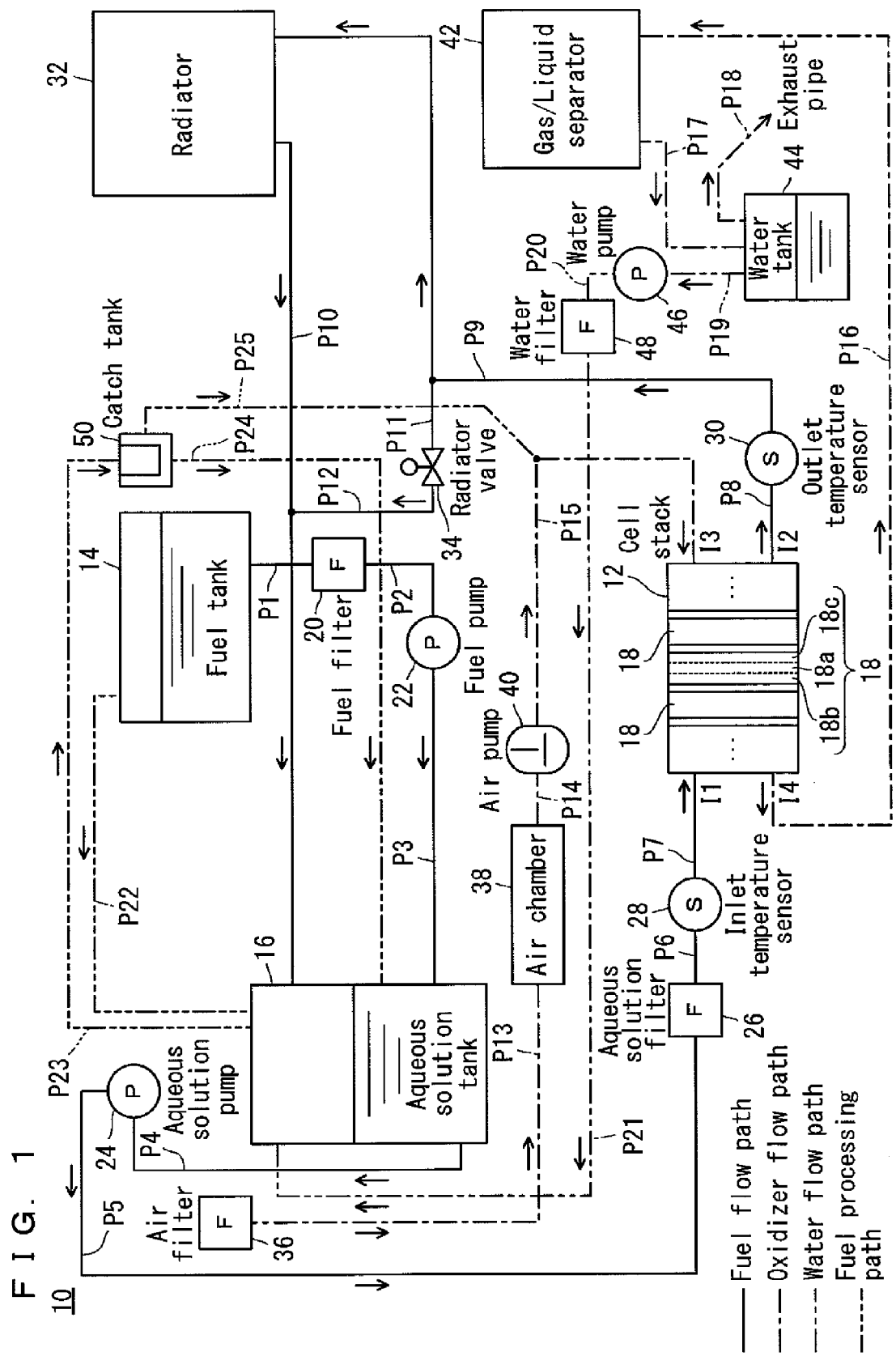
FIG. 1 is a system diagram showing a primary configuration of a fuel cell system according to a preferred embodiment of the present invention.

Referring to FIG. 1, a fuel cell system 10 according to a preferred embodiment of the present invention is a direct methanol fuel cell system which uses methanol (an aqueous solution of methanol) directly without reformation, for generation of electric energy (power generation). The fuel cell system 10 generates electric energy to be used for driving system components and the equipment on which the fuel cell system 10 is mounted.

The fuel cell system 10 includes a cell stack 12, a fuel tank 14 and an aqueous solution tank 16. The cell stack 12 includes a plurality of individual fuel cells 18 stacked and alternately separated by separators. Each fuel cell 18 is capable of generating electric power through electrochemical reactions between hydrogen ion based on methanol, and oxygen. Each fuel cell 18 in the cell stack 12 includes an electrolyte film 18a provided by a solid polymer film for example, and a pair of an anode (fuel electrode) 18b and a cathode (air electrode) 18c opposed to each other with the electrolyte film 18a in between. The anode 18b and the cathode 18c each include a platinum catalyst layer provided on the side closer to the electrolyte film 18a.

The fuel tank 14 contains a methanol fuel (high concentration aqueous solution of methanol) of a high concentration (containing methanol at approximately 50 wt %, for example) which is used as fuel for the electrochemical reaction in the cell stack 12. The aqueous solution tank 16 contains aqueous methanol solution which is a solution of the methanol fuel from the fuel tank 14 diluted to a suitable concentration (containing methanol at approximately 3 wt %, for example) for the electrochemical reaction in the cell stack 12.

The fuel tank 14 is connected with a fuel filter 20 by a pipe P1. The fuel filter 20 is connected with a fuel pump 22 by a pipe P2. The fuel pump 22 is connected with the aqueous solution tank 16 by a pipe P3. As the fuel pump 22 is driven, methanol fuel inside the fuel tank 14 is supplied to the aqueous solution tank 16.

The aqueous solution tank 16 is connected with an aqueous solution pump 24 by a pipe P4. The aqueous solution pump 24 is connected with an aqueous solution filter 26 by a pipe P5. The aqueous solution filter 26 is connected with an inlet temperature sensor 28 by a pipe P6. The inlet temperature sensor 28 is connected with an anode inlet I1 of the cell stack 12 by a pipe P7. As the aqueous solution pump 24 is driven, aqueous methanol solution inside the aqueous solution tank 16 is supplied to the cell stack 12. The inlet temperature sensor 28 detects a temperature of aqueous methanol solution which flows into the cell stack 12.

The cell stack 12 has an anode outlet I2, which is connected with an outlet temperature sensor 30 by a pipe P8. The outlet temperature sensor 30 is connected with a radiator 32 by a pipe P9. The radiator 32 is connected with the aqueous solution tank 16 by a pipe P10. The outlet temperature sensor 30 detects a temperature of aqueous methanol solution which flows out of the cell stack 12, and the detected temperature is regarded as the temperature of the fuel cell 18, i.e., of the cell stack 12. A detection result by the inlet temperature sensor 28 may be regarded as the temperature of the fuel cell 18, i.e., of the cell stack 12. A temperature sensor may be attached directly to the cell stack 12 in order to directly measure a temperature of the fuel cell 18, i.e., of the cell stack 12. The radiator 32 is provided with a fan 32a (see FIG. 2) in order to cool the radiator 32.

The pipes P9 and P10 are connected with each other via a pipe P11, a radiator valve 34 and a pipe P12 to provide a flow path which bypasses the radiator 32.

The pipes P1 through P12 serve primarily as a fuel flow path.

The cell stack 12 is also supplied with external air which contains oxygen (an oxidizer) and is taken through an air filter 36. The air filter 36 is connected with an air chamber 38 by a pipe P13. The air chamber 38 is connected with an air pump 40 by a pipe P14. The air pump 40 is connected with a cathode inlet I3 of the cell stack 12 by a pipe P15. As the air pump 40 is driven, the external air is supplied to the cell stack 12.

The cell stack 12 has a cathode outlet I4, which is connected with a gas-liquid separator 42 by a pipe P16. The gas-liquid separator 42 is connected with a water tank 44 by a pipe P17. The gas-liquid separator 42 is provided with a fan 42a (see FIG. 2) to cool the gas-liquid separator 42. The water tank 44 is provided with a pipe (exhaust pipe) P18 which communicates with the outside.

The pipes P13 through P18 serve primarily as a flow path of the oxidizer.

The water tank 44 is connected with a water pump 46 by a pipe P19. The water pump 46 is connected with a water filter 48 by a pipe P20. The water filter 48 is connected with the aqueous solution tank 16 by a pipe P21. As the water pump 46 is driven, water inside the water tank 44 is supplied to the aqueous solution tank 16.

The pipes P19 through P21 as described serve as a flow path of water.

The fuel tank 14 has a gas space, which communicates with a gas space in the aqueous solution tank 16 through a pipe P22. The gas space in the aqueous solution tank 16 communicates with a catch tank 50 through a pipe P23. The catch tank 50 is connected with the aqueous solution tank 16 by a pipe P24 so that liquid therein will be supplied to the aqueous solution tank 16. Further, the catch tank 50 is connected with the pipe P15 by a pipe P25.

The pipes P22 through P25 as described serve primarily as a flow path for fuel processing.

Figure 2:
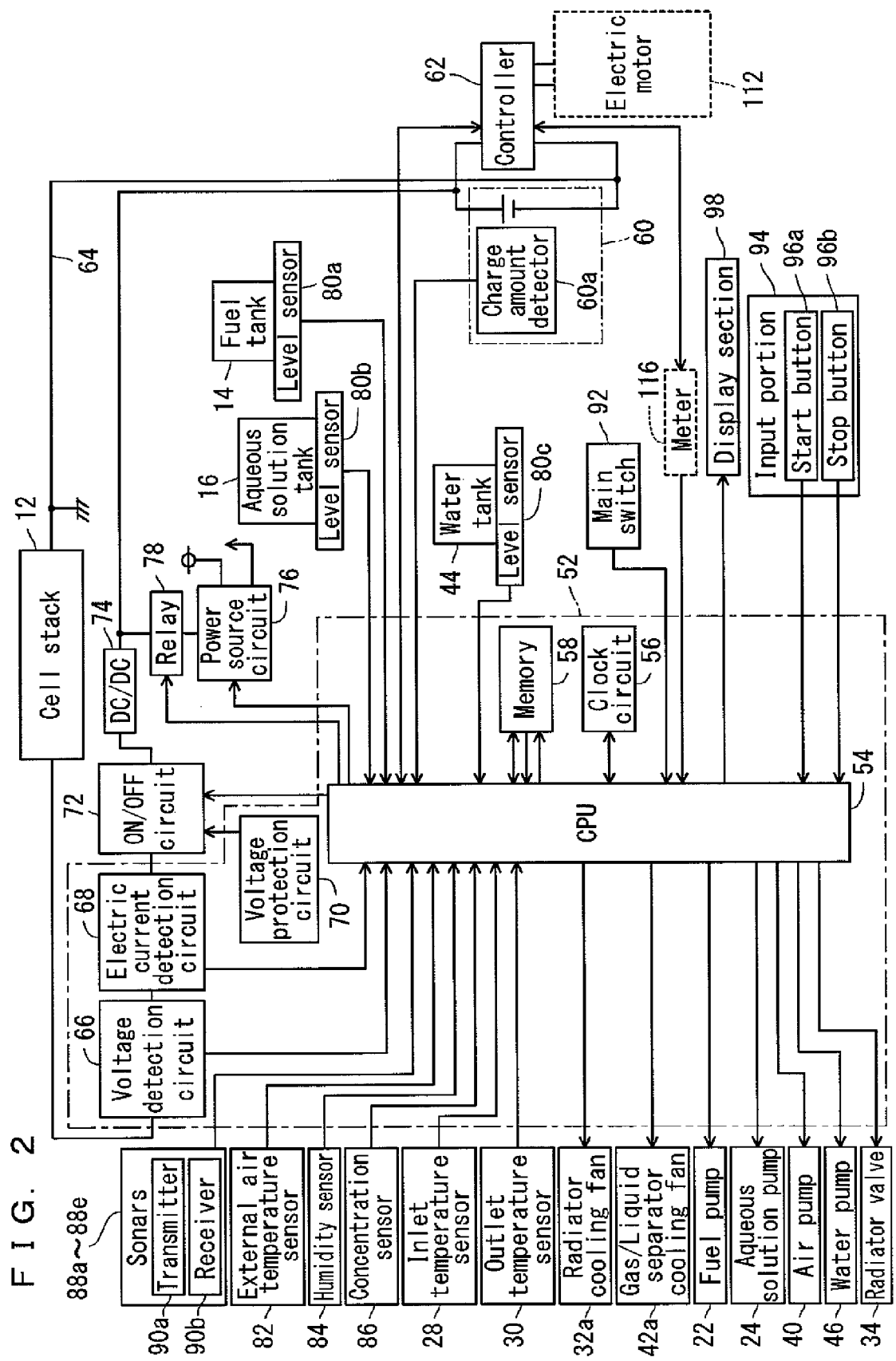
FIG. 2 is a block diagram showing an electric configuration of the fuel cell system according to a preferred embodiment of the present invention.

Next, description will cover an electrical configuration of the fuel cell system 10 with reference to FIG. 2.

The fuel cell system 10 includes a controller 52. The controller 52 includes a CPU 54 which performs necessary calculations and controls operations of the fuel cell system 10; a clock circuit 56 which provides the CPU 54 with clock signals; a memory 58 which is preferably provided by, e.g., an EEPROM and stores programs, data, calculation data, etc., for controlling the operations of the fuel cell system 10; a voltage detection circuit 66 which detects a voltage to be regarded as a voltage of the cell stack 12, in an electric circuit 64 that connects the cell stack 12 with the secondary battery 60 and the controller 62; an electric current detection circuit 68 which detects an electric current in the cell stack 12; and a voltage protection circuit 70 which protects the electric circuit 64.

The electric circuit 64 has a series connection with an ON/OFF circuit 72 which opens and closes the electric circuit 64, and with a DC-DC converter 74. Further, the electric circuit 64 is connected, via a relay 78, with a power source circuit 76 which outputs a predetermined voltage. The voltage protection circuit 70 opens the ON/OFF circuit 72 when a voltage drop is detected in the cell stack 12.

The secondary battery 60, which is connected with the electric circuit 64, is charged with electricity from the cell stack 12 and supplies electricity to the system components, the controller 62, etc., as necessary. The secondary battery 60 is arranged to be disconnected from the electric circuit 64, i.e., removable from the fuel cell system 10, and is chargeable by removing from the fuel cell system 10 and connecting with an external power source (commercial power source).

Also, the fuel cell system 10 includes level sensors 80a through 80c, an external air temperature sensor 82, a humidity sensor 84, a concentration sensor 86 and sonars 88a through 88e.

The CPU 54 is supplied with detection signals from the inlet temperature sensor 28, the outlet temperature sensor 30, the level sensors 80a through 80c, the external air temperature sensor 82, the humidity sensor 84, the concentration sensor 86 and the sonars 88a through 88e.

The level sensor 80a is attached to the fuel tank 14. The level sensor 80b is attached to the aqueous solution tank 16. The level sensor 80c is attached to the water tank 44. Each of the level sensors 80a through 80c detects a height of liquid (liquid level) in the tank in which the sensor is attached. Based on detections signals from the level sensors 80a through 80c, the CPU 54 obtains the amount of liquid in the fuel tank 14, the aqueous solution tank 16 and the water tank 44.

The external air temperature sensor 82 detects a temperature of external air. The humidity sensor 84 detects a humidity of the external air. The concentration sensor 86 detects a methanol concentration in the external air. Each of the sonars 88a through 88e preferably is an active sonar which includes a transmitter 90a that emits an ultrasonic wave as a detection signal, and a receiver 90b that receives the ultrasonic wave as a reflection signal. Each of the sonars 88a through 88e detects or measures a distance to a surrounding object such as a wall, based on an elapsed time from ultrasonic wave emission from emission device, i.e., the transmitter 90a to reflection wave reception by reception device, i.e., the receiver 90b.

The CPU 54 is also supplied with a voltage detection value from the voltage detection circuit 66 and an electric current detection value from the current detection circuit 68. From these values, the CPU 54 calculates an output of the cell stack 12. Also, the CPU 54 can calculate an output per fuel cell 18 by dividing the output from the cell stack 12 by the number of the fuel cells 18.

Further, the CPU 54 is supplied with an input signal from a main switch 92 for starting the controller 52, and input signals from an input section 94. The input section 94 includes a start button 96a which makes electrical connection between an external load (an electric motor 112 in this preferred embodiment) and the secondary battery 60, and a stop button 96b which turns off the ON/OFF circuit 72. As the start button 96a or the stop button 96b is operated, an input signal is entered to the CPU 54.

Further, the CPU 54 is supplied with a detection signal from a charge amount detector 60a which is incorporated in the secondary battery 60. Using the detection signal from the charge amount detector 60a and information regarding the capacity of the secondary battery 60, the CPU 54 calculates a charge rate (a ratio of the amount of charge to the capacity of the secondary battery 60) of the secondary battery 60.

The CPU 54 controls the system components such as the fuel pump 22, the aqueous solution pump 24, the air pump 40, the water pump 46, the fans 32a, 42a and the radiator valve 34. Also, the CPU 54 controls open/close operations of the ON/OFF circuit 72 and the relay 78, and controls an operation of the power source circuit 76.

The CPU 54 is connected with a controller 62 which controls operation of the electric motor 112, and a display section 98 which displays various kinds of information. Following commands from the CPU 54, the controller 62 controls states of connection between the electric motor 112, the cell stack 12 and the secondary battery 60, as well as power supply to the electric motor 112, etc. The display section 98 is provided by a liquid crystal display for example, and notifies the operator with various kinds of information following commands from the CPU 54.

The memory 58 which represents memory stores programs for performing operations shown in FIG. 5 and FIG. 6, a first through a fifth tables which will be described later, etc.

In the present preferred embodiment, the CPU 54 preferably functions as a control device and a setting device. A change information obtaining device preferably includes the CPU 54, an output detector which has the voltage detection circuit 66 and the current detection circuit 68, an air temperature detector provided by the external air temperature sensor 82, and a humidity detector provided by the humidity sensor 84. A time measuring device preferably includes the CPU 54 and the clock circuit 56. A space information obtaining device preferably includes the CPU 54 and the sonars 88$a$ through 88$e$. Further, in the present preferred embodiment, change information obtaining device preferably includes a concentration detector provided by the concentration sensor 86.

Next, a principal operation in the fuel cell system 10 will be described.

First, when the main switch 92 is turned on, the controller 52 is started and the relay 78 is turned on. As the relay 78 is turned on, the voltage from the secondary battery 60 is converted to a predetermined voltage by the power source circuit 76, and the power from the secondary battery 60 enables electrical components of the fuel cell system 10. Then, as the start button 96$a$ is pressed, the controller 62 makes an electrical connection between the electric motor 112 and the secondary battery 60 to enable the electric motor 112. Thereafter, as the charge rate of the secondary battery 60 decreases to a lower limit value (approximately 40%, for example), the ON/OFF circuit 72 is turned on to connect the cell stack 12 with the secondary battery 60 and the controller 62. Then, system components such as the aqueous solution pump 24 and the air pump 40 are started to commence power generation in the cell stack 12. The charge rate lower limit value of the secondary battery 60 is determined based on a power requirement which is necessary to keep driving the system components and the electric motor 112 until the fuel cell system 10 has shifted to normal operation where constant power generation is possible.

Next, a power generating operation by the cell stack 12 will be described with reference to the FIG. 1.

As the aqueous solution pump 24 is driven, aqueous methanol solution in the aqueous solution tank 16 is supplied directly to the anode 18$b$ in each of the fuel cells 18 in the cell stack 12 through the anode inlet I1. Concentration of the aqueous methanol solution in the aqueous solution tank 16 is appropriately adjusted by supplying methanol fuel from the fuel tank 14 based on detection results from the concentration detector which is preferably provided by an ultrasonic wave sensor (not shown), or other suitable device.

Gasses in the aqueous solution tank 16 (primarily carbon dioxide, gaseous methanol and water vapor) are sent to the catch tank 50 via the pipe P23. The gaseous methanol and water vapor are cooled in the catch tank 50, and aqueous methanol solution obtained in the catch tank 50 is returned to the aqueous solution tank 16 via the pipe P24. Gases remaining in the catch tank 50 (carbon dioxide, un-liquefied methanol and water vapor) are sent to the pipe P15 via the pipe P25.

As the air pump 40 is driven, air is introduced from outside and is supplied to the cathode 18$c$ in each of the fuel cells 18 in the cell stack 12 through the cathode inlet I3, together with the gasses from the catch tank 50.

At the anode 18$b$ in each fuel cell 18, methanol and water in the supplied aqueous methanol solution chemically react with each other to produce carbon dioxide and hydrogen ions. The produced hydrogen ions flow into the cathode 18$c$ via the electrolyte film 18$a$, and electrochemically react with oxygen (oxidizer) in the air supplied to the cathode 18$c$, to produce water (water vapor) and electric energy. In other words, power generation is performed in the cell stack 12. The power from the cell stack 12 is utilized to charge the secondary battery 60, to drive the external load, i.e., the electric motor 112, and other purposes. The temperature of the cell stack 12 is increased by the heat associated with the electrochemical reactions. The output of the cell stack 12 increases as the temperature rises. As the cell stack 12 reaches approximately 60° C., for example, the fuel cell system 10 shifts from warm-up operation to normal operation.

The carbon dioxide and unused aqueous methanol solution produced at the anode 18$b$ in each fuel cell 18 are heated in the electrochemical reactions, supplied to the radiator 32 via the anode outlet I2, cooled and then returned to the aqueous solution tank 16. The cooling of the carbon dioxide and unused methanol by the radiator 32 is facilitated by driving the fan 32$a$ (see FIG. 2). During the warm-up operation, for example, where there is no need to cool the aqueous methanol solution which comes out of the anode outlet I2, the radiator valve 34 is opened in order to allow part of the aqueous methanol solution to bypass the radiator 32.

Most of the water vapor occurred on the cathode 18$c$ in each fuel cell 18 is liquefied and discharged from the cathode outlet I4 in the form of water, but saturated water vapor is discharged in the form of gas. Exhaust gas which contains the moisture (water and water vapor), carbon dioxide, unused air, etc., discharged from the cathode outlet I4 is cooled in the gas-liquid separator 42, and part of the water vapor is liquefied as its temperature decreases to or below the dew point. The liquefying of the water vapor by the gas-liquid separator 42 is facilitated by driving the fan 42$a$ (see FIG. 2). Exhaust gas which contains water, water vapor, carbon dioxide, unused air, etc., discharged from the gas-liquid separator 42 is supplied to the water tank 44, where water is collected in the water tank 44 while exhaust gas containing water vapor, carbon dioxide, unused air, etc., is discharged to the outside via the pipe P18. Water which was collected in the water tank 44 is appropriately returned to the aqueous solution tank 16 by a pumping operation of the water pump 46, and is used as water for aqueous methanol solution.

Normally, the exhaust from the pipe P18 is warmer than the external air due to heat absorption during the electrochemical reactions. Specifically, in normal operation where the external air temperature is approximately 25° C., the exhaust gas from the pipe P18 will have a temperature of approximately 55° C. through 60° C.

The power generating operation in the cell stack 12 as described above is continued until the charge rate of the secondary battery 60 has reached an upper limit value (approximately 98%, for example) whether or not the equipment (for example, a motorbike 100 in the present preferred embodiment: See FIG. 3 and FIG. 4) powered by the fuel cell system 10 is in operation. Then, as the charge rate of the secondary battery 60 has reached the upper limit value, the system components are stopped and power generation in the cell stack 12 is stopped. By charging the secondary battery 60 as described above, it is possible to maintain the charge rate of the secondary battery 60 not lower than the lower limit value (for example, about 40% in the present preferred embodiment), ensuring that the fuel cell system 10 is shifted to normal operation after power generation is started next time.

Figure 3:
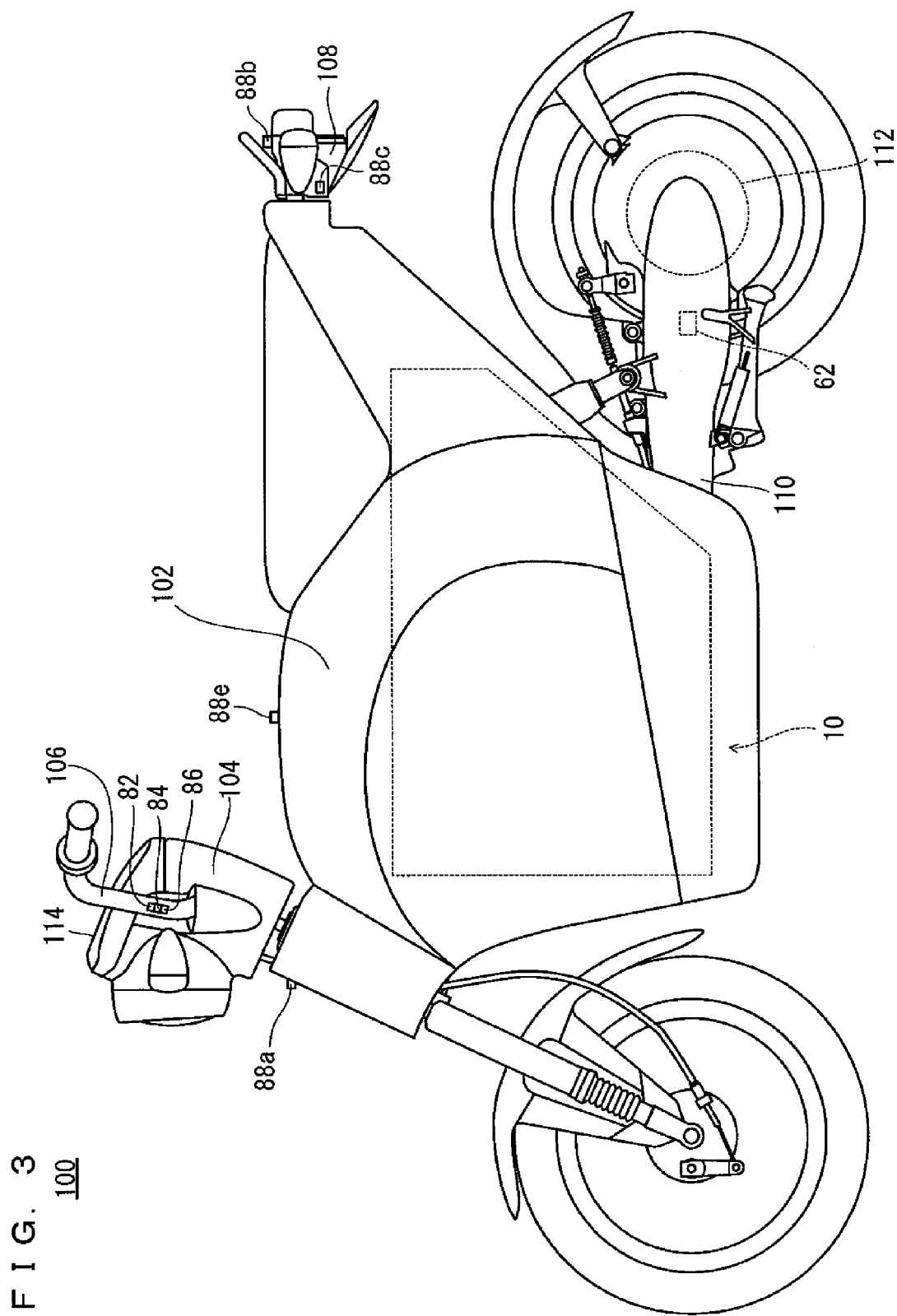
FIG. 3 is a left side view of a motorbike equipped with the fuel cell system according to a preferred embodiment of the present invention.
Figure 4:
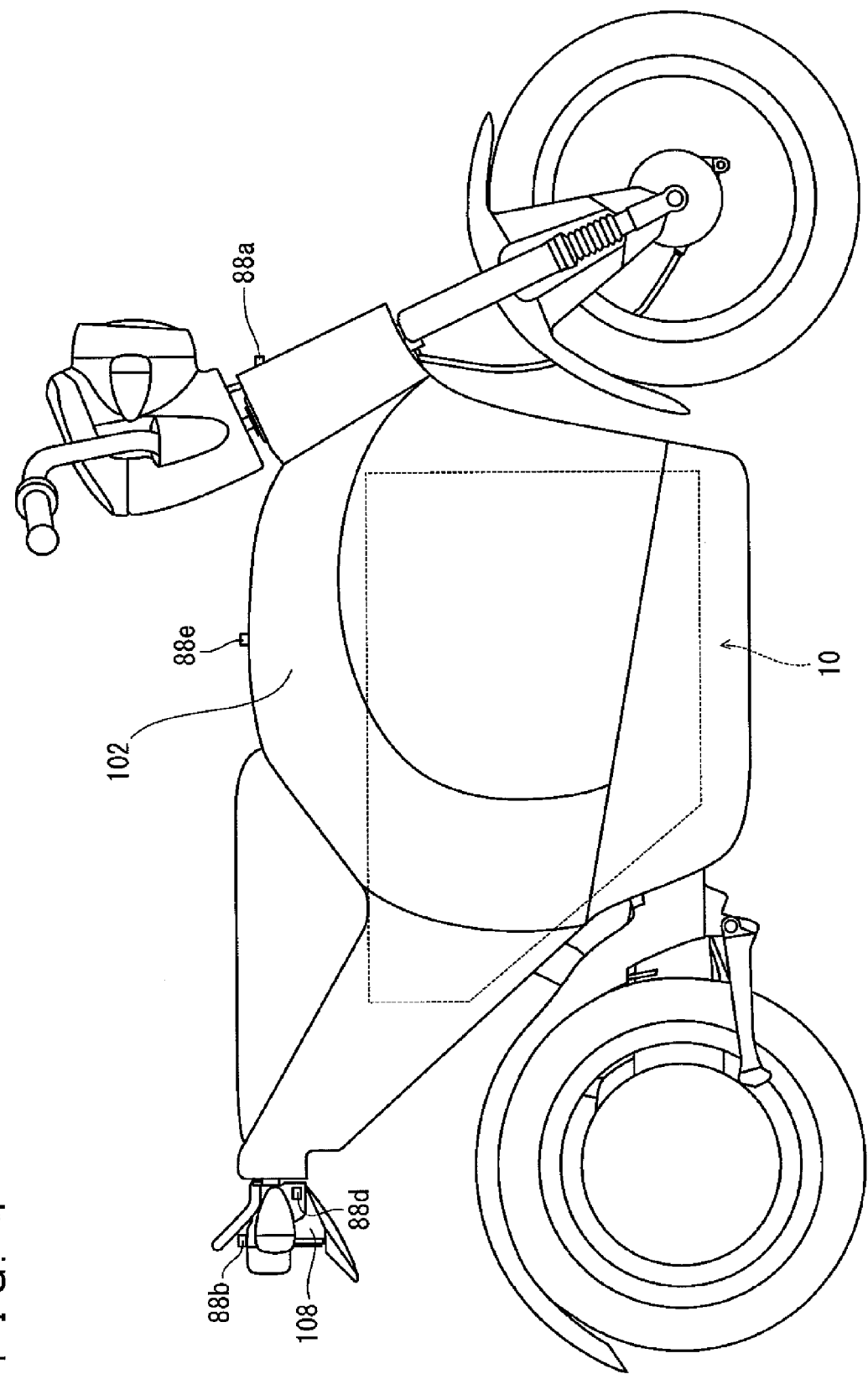
FIG. 4 is a right side view of the motorbike in FIG. 3.

Referring now to FIG. 3 and FIG. 4, the fuel cell system 10 as described is mounted on a motorbike 100 which is an example of transportation equipment. Note that the terms left and right, front and rear, up and down as used in this preferred embodiment are determined from the normal state of riding on a motorbike, i.e., as viewed by the driver sitting on the seat of the motorbike 100, facing toward a handle 106.

The cell stack 12, various tanks, system components, and other main elements which constitute the fuel cell system 10 are secured to a frame of the motorbike 100 inside a cover 102.

The external air temperature sensor 82, the humidity sensor 84, the concentration sensor 86, and the sonars 88a through 88e are attached to the motorbike 100 and exposed to the outside. Specifically, the external air temperature sensor 82, the humidity sensor 84 and the concentration sensor 86 are attached to a left-hand portion of a handle 106 which extends in the right-and-left directions from a handle support 104 disposed above the cover 102 (see FIG. 3). The sonar 88a is attached to a front surface of the cover 102, the sonar 88b is attached to an upper surface of a tail unit 108 which extends rearward from the cover 102, the sonar 88c is attached to a left side surface of the tail unit 108 (see FIG. 3), the sonar 88d is attached to a right side surface of the tail unit 108 (see FIG. 4), and the sonar 88e is attached to an upper surface of the cover 102.

The sonar 88a detects a distance to a forward object such as a wall based on a time elapsed from a moment when the transmitter 90a has emitted an ultrasonic wave in a forward direction to a moment when the receiver 90b has received a reflected wave of the ultrasonic wave. Likewise, the sonar 88b detects a distance to a rearward object, the sonar 88c detects a distance to a leftward object, the sonar 88d detects a distance to a rightward object, and the sonar 88e detects a distance to an upward object.

From the cover 102, a swing arm 110 extends in a rearward direction, and inside its rear end, the electric motor 112 is mounted. The controller 62 is preferably mounted inside the swing arm 110.

The handle support 104 has an upper end provided with a display/operation board 114. The display/operation board 114 is an integrated dashboard including the input section 94 and the display section 98 of the fuel cell system 10, and a meter 116 (see FIG. 2). As shown in FIG. 2, the meter 116 is connected with the CPU 54 and the controller 62, measures and displays various data regarding the electric motor 112 via the controller 62, and supplies the data to the CPU 54.

The motorbike 100 as described above is often stored in a garage after the main switch 92 is turned off and therefore after the electric motor 112 has been disconnected from the cell stack 12 and from the secondary battery 60. In other words, the motorbike 100 is usually stored in a garage after its operation has been shut down. The garage where the motorbike 100 is stored may have a box-like construction with a movable door in its front wall, and in this case the motorbike 100 is placed in a closed space (a space of poor air exchange with the outside) inside the garage. Hereinafter, unless otherwise stated, description will assume that a garage has a closed space within itself, and the wording "to be disposed in a garage" will mean that the storage is made inside the closed space.

Now, the motorbike 100 is disposed in the garage after its operation has been shut down, and the cell stack 12 continues power generation in order to charge the secondary battery 60. This decreases the amount of oxygen in the air inside the garage and consequently, it becomes impossible to provide sufficient supply of oxygen to the cathode 18c in each fuel cell 18. Specifically, while there may be sufficient supply of oxygen on an upstream side of an air path on the cathode 18c particularly in those fuel cells 18 which are closer to the cathode inlet I3, there can be deficiency of oxygen on a downstream side. As a result, electrochemical reactions (power generation) are localized particularly in portions of those fuel cells 18 where there is sufficient supply of oxygen to the cathode 18c. This leads to accelerated deterioration of the fuel cells 18, i.e., the cell stack 12.

In order to prevent this, the fuel cell system 10 checks if the cell stack 12 is generating power when operation of the motorbike 100 is stopped (when the main switch 92 is turned off), and if the cell stack 12 is generating power, reference is made, as necessary, to a first through a fifth tables which are stored in the memory 58 to set a duration time for continued power generation in the cell stack 12 and then, at the lapse of the set duration time, power generation in the cell stack 12 is stopped.

Next, description will be made for the first through the fifth tables which are used for setting the duration time.

FIRST TABLE

| | Volume V ($m^3$) | | | | |
|---|---|---|---|---|---|
| | Predetermined Range | | | | |
| | $V \geq 20$ | $20 > V \geq 15$ | $15 > V \geq 10$ | $10 > V \geq 5$ | $5 > V$ |
| Duration Time (min.) | — | 45 | 30 | 15 | — |

SECOND TABLE

| | Amount of Temperature Change T (° C./min.) | | | | |
|---|---|---|---|---|---|
| | Predetermined Range | | | | |
| | $T < 1$ | $1 \leq T < 2$ | $2 \leq T < 3$ | $3 \leq T < 4$ | $4 \leq T$ |
| Duration Time (min.) | — | 60 | 30 | 15 | — |

THIRD TABLE

| | Amount of Humidity Change H (% RH/min.) | | | | |
|---|---|---|---|---|---|
| | Predetermined Range | | | | |
| | $H < 3$ | $3 \leq H < 5$ | $5 \leq H < 10$ | $10 \leq H < 20$ | $20 \leq H$ |
| Duration Time (min.) | — | 60 | 30 | 10 | — |

FOURTH TABLE

| | Amount of Concentration Change C (ppm/min.) | | | | |
|---|---|---|---|---|---|
| | Predetermined Range | | | | |
| | $C < 0.5$ | $0.5 \leq C < 1$ | $1 \leq C < 2$ | $2 \leq C < 3$ | $3 \leq C < 4$ | $4 \leq C$ |
| Duration Time (min.) | — | 180 | 90 | 40 | 15 | — |

FIFTH TABLE

| | Amount of Output Change O (W/min.) | | | | |
| --- | --- | --- | --- | --- | --- |
| | | Predetermined Range | | | |
| | O < 20 | 20 ≤ O < 40 | 40 ≤ O < 80 | 80 ≤ O < 160 | 160 ≤ O |
| Duration Time (min.) | — | 45 | 30 | 15 | — |

The first table records a relationship between the volume of garage (size of the closed space) and the duration time which will not accelerate the deterioration of cell stack 12. The greater the volume of garage, the greater the amount of oxygen in the garage. Therefore, based on the volume of the garage, it is possible to obtain a duration time which will not accelerate the deterioration. The first table was obtained through research in which power generation by a cell stack 12 was conducted in a plurality of garages of different volumes to determine various duration times (to be described later) which will not accelerate the deterioration of the cell stack 12.

The second table records a relationship between an amount of temperature change in external air (ambient air surrounding the motorbike 100) per minute and the duration time which will not accelerate the deterioration of cell stack 12. As has been described earlier, exhaust gas from the pipe P18 is warmer than the external air, and will change (increase) air temperature inside the garage more quickly than in a naturally expected change if the cell stack 12 continues to generate power inside the garage. The smaller is the volume of garage, the greater the amount of temperature increase in the air inside the garage in association with the power generation. Therefore, based on the temperature change, it is possible to estimate the volume of the garage and then obtain a duration time which will not accelerate the deterioration. The second table was obtained through research in which power generation by a cell stack 12 was conducted in a plurality of garages of different volumes to establish a relationship between the amount of temperature change per minute and the duration time which will not accelerate the deterioration.

The third table records a relationship between the amount of humidity change in the external air per minute and the duration time which will not accelerate the deterioration of cell stack 12. As has been described earlier, exhaust gas from the pipe P18 contains water vapor and will change (increase) air humidity inside the garage more quickly than in a naturally expected change if the cell stack 12 continues to generate power inside the garage. The smaller the volume of garage, the greater the amount of air humidity increase in the garage in association with the power generation. Therefore, based on the humidity change, it is possible to estimate the volume of the garage and then obtain a duration time which will not accelerate the deterioration. The third table was obtained through research in which power generation by a cell stack 12 was conducted in a plurality of garages of different volumes to establish a relationship between the amount of humidity change per minute and the duration time which will not accelerate the deterioration.

The fourth table records a relationship between the amount of methanol concentration change in the external air per minute and the duration time which will not accelerate deterioration of the cell stack 12. Most of methanol which moves from the anode 18b to the cathode 18c due to crossover phenomenon is decomposed into water and carbon dioxide in the platinum catalyst layer of the cathode 18c. However, a small amount of methanol is discharged from the cathode outlet I4 of the cell stack 12. Although most of the methanol from the cathode outlet I4 is liquefied in the gas-liquid separator 42 and collected in the water tank 44, a minute amount of the methanol is discharged from the pipe P18 in the gaseous state. Thus, exhaust gas from the pipe P18 contains a minute amount of methanol, and will change (increase) methanol concentration in the air inside the garage more quickly than in a naturally expected change if the cell stack 12 continues to generate power inside the garage. The smaller is the volume of garage, the greater the amount of methanol concentration increase in the air inside the garage in association with the power generation. Therefore, based on the methanol concentration change, it is possible to estimate the volume of the garage and then obtain a duration time which will not accelerate the deterioration. The fourth table was obtained through research in which power generation by a cell stack 12 was conducted in a plurality of garages of different volumes to establish a relationship between the amount of methanol concentration change per minute and the duration time which will not accelerate the deterioration.

The fifth table records a relationship between the amount of output change in the cell stack 12 per minute and the duration time which will not accelerate deterioration of the cell stack 12. As has been described earlier, continued power generation in the cell stack 12 inside the garage will decrease the amount of oxygen in the garage, and will change (decrease) the output of the cell stack 12 more quickly than in a normally expected change. Therefore, based on the output change, it is possible to estimate the volume of the garage and then obtain a duration time which will not accelerate the deterioration. The fifth table was obtained through research in which power generation by a cell stack 12 was conducted in a plurality of garages of different volumes to establish a relationship between the amount of output change per minute and the duration time which will not accelerate the deterioration.

It should be noted here that if the air in a garage has an oxygen concentration of approximately 18%, for example, then deterioration of the cell stack 12 due to continued power generation inside the garage shows very little difference from deterioration due to continued power generation in an open space where the system is supplied with air of a normal oxygen concentration (approximately 20%). Based on this, "the duration time which will not accelerate deterioration of the cell stack 12" is set to those predetermined values which will not lower the oxygen concentration in the air inside the garage than a predetermined value (18%, for example) when the cell stack 12 continues its power generation in the garage.

Next, an example of operation performed by the fuel cell system 10 when the motorbike 100 is shut down will be described with reference to FIG. 5 and FIG. 6. In this example, operation of the motorbike 100 is shut down while the cell stack 12 is generating power.

First, if Step S1 determines that the main switch 92 has been turned off and thus the motorbike 100 has stopped its operation, then the external air temperature sensor 82 detects a temperature, the humidity sensor 84 detects a humidity, the concentration sensor 86 detects a methanol concentration, the voltage detection circuit 66 detects a voltage value, and the current detection circuit 68 detects an electric current value (Step S3).

Then, the system waits (Step S5) until a predetermined time (one minute for example) has passed since the last series of detection. Upon the lapse of the predetermined time, the sonars 88a through 88e perform distance detections, and the next series of detections are performed by the external air temperature sensor 82, the humidity sensor 84, the concentration sensor 86, the voltage detection circuit 66 and the current detection circuit 68 (Step S7).

Subsequently, the CPU 54 obtains a volume of the garage (size of the closed space) where the motorbike 100 is disposed, the amount of external air temperature change, the amount of humidity change and the amount of methanol concentration change, as well as the amount of output change in the cell stack 12 (Step S9). The volume of the garage, the amount of temperature change, the amount of humidity change, the amount of methanol concentration change and the amount of output change which were obtained in Step S9 are stored in the memory 58 as space information, temperature change information, humidity change information, concentration change information and output change information, respectively.

In Step S9 calculation is made for a sum of a distance to the forward object (a wall, for example, if inside a garage) detected by the sonar 88*a*, a distance to the rear ward object detected by the sonar 88*b* and a predetermined horizontal distance between the sonars 88*a* and 88*b* to obtain a first dimension. Also, calculation is made for a sum of a distance to the leftward object detected by the sonar 88*c*, a distance to the rightward object detected by the sonar 88*d* and a predetermined horizontal distance between the sonars 88*c* and 88*d* to obtain a second dimension. Further, calculation is made for a sum of a distance to the upward object (a ceiling for example, if inside a garage) detected by the sonar 88*e* and a predetermined distance from the sonar 88*e* to the ground, to obtain a third dimension. Then, the first, the second and the third dimensions which were obtained are assumed to be the width, the depth and the height dimensions of the inside of the garage, and a product of these values is calculated to obtain (estimate) a volume of the garage.

Also, calculation is made for a difference between the latest detection result and the previous detection result from the external air temperature sensor 82 to obtain an amount of temperature change in the external air per a predetermined time (one minute in this embodiment). Likewise, an amount of humidity change in the external air per minute is obtained using the latest detection result and the previous detection result from the humidity sensor 84, and an amount of methanol concentration change in the external air per minute is obtained using the latest detection result and the previous detection result from the concentration sensor 86.

Also, calculation is made for an amount of output change in the cell stack 12 per minute by obtaining a difference between two output values, i.e., the latest output value calculated by using the latest detection results from the voltage detection circuit 66 and the current detection circuit 68, and the previous output value calculated by using the previous detection results from the voltage detection circuit 66 and the current detection circuit 68.

It should be noted here that in the first execution of Step S9, the latest detection result is provided by a detection result obtained in the first execution of Step S7 whereas the previous detection result is provided by a detection result obtained in Step S3. In the second and later executions of Step S9, the latest detection result is provided by a detection result obtained in the latest execution of Step S7, and the previous detection result is provided by a detection result obtained in the previous execution of Step S7. With such an arrangement as the above, it is easy to obtain the amounts of change described earlier.

Subsequently, the CPU 54 determines if the volume obtained in Step S9 is smaller than a first threshold value (approximately 20 $m^3$, for example) and not smaller than a second threshold value (approximately 5 $m^3$, for example). In other words, a determination is made whether or not the obtained volume falls in a first predetermined range (Step S11). If the obtained volume is in the first predetermined range, the CPU 54 assumes that the motorbike 100 is disposed in a small garage, and obtains a duration time which matches the obtained volume from the first table. The duration time obtained from the first table is stored in the memory 58 as a first duration time. In other words, a first duration time is set (Step S13). Thereafter, the process goes to Step S15 for determination.

On the other hand, if the obtained volume is not smaller than the first threshold value (for example, about 20 $m^3$ in the present preferred embodiment), the process skips Step S13 and goes to Step S15 on an assumption that the garage is large enough not to cause accelerated deterioration of the cell stack 12. If the obtained volume is smaller than the second threshold value (for example, about 5 $m^3$ in the present preferred embodiment), the process goes to Step S15 on an assumption that, for example, the detected volume is not correct because the motorbike 100 may be surrounded by cartons, etc. In other words, if the obtained volume is out of the first predetermined range, the process skips Step S13 and goes to Step S15.

In Step S15, the CPU 54 determines whether or not the amount of temperature change obtained in Step S9 is not smaller than a first threshold value (about 1° C., for example) and smaller than a second threshold value (about 4° C., for example). In other words, a determination is made whether or not the obtained amount of temperature change falls in a second predetermined range. If the obtained amount of temperature change is in the second predetermined range, the CPU 54 assumes that the motorbike 100 is disposed in a small garage, and obtains a duration time which matches the obtained amount of temperature change from the second table. The duration time obtained from the second table is stored in the memory 58 as a second duration time. In other words, the second duration time is set (Step S17). Thereafter, the process goes to Step S19 for determination.

On the other hand, if the obtained amount of temperature change is smaller than the first threshold value (about 1° C., in the present preferred embodiment), the process skips Step S17 and goes to Step S19 on an assumption that the change is within a range of natural temperature change and the motorbike is not disposed in a garage. If the obtained amount of temperature change is not smaller than the second threshold value (about 4° C., in the present preferred embodiment), the process goes to Step S19 on an assumption that the detected amount of temperature change is not correct due to influences from room heating equipment for example, which might have been operating in the garage at the time when the motorbike 100 was brought into the garage. In other words, if the obtained amount of temperature change is out of the second predetermined range, the process skips Step S17 and goes to Step S19.

In Step S19, the CPU 54 determines whether or not the amount of humidity change obtained in Step S9 is not smaller than a first threshold value (3% RH for example) and smaller than a second threshold value (20% RH for example). In other words, a determination is made whether or not the obtained amount of humidity change falls in a third predetermined range. If the obtained amount of humidity change is in the third predetermined range, the CPU 54 assumes that the motorbike 100 is disposed in a small garage, and obtains a duration time which matches the obtained amount of humidity change from the third table. The duration time obtained from the third table is stored in the memory 58 as a third duration time. In other words, the third duration time is set (Step S21). Thereafter, the process goes to Step S23 in FIG. 6, for determination.

On the other hand, if the obtained amount of humidity change is smaller than the first threshold value (about 3% RH in the present preferred embodiment), the process skips Step S21 and goes to Step S23 on an assumption that the change is within a range of natural humidity change and the motorbike is not disposed in a garage. If the obtained amount of humidity change is not smaller than the second threshold value (about 20% RH in the present preferred embodiment), the process goes to Step S23 on an assumption that the detected amount of humidity change is not correct due to influences from room humidifier equipment for example, which might have been operating in the garage at the time when the motorbike 100 was brought into the garage. In other words, if the obtained amount of humidity change is out of the third predetermined range, the process skips Step S21 and goes to Step S23.

In Step S23, the CPU 54 determines whether or not the amount of methanol concentration change obtained in Step S9 is not smaller than a first threshold value (about 0.5 ppm, for example) and smaller than a second threshold value (about 4 ppm, for example). In other words, a determination is made whether or not the obtained amount of methanol concentration change falls in a fourth predetermined range. If the obtained amount of methanol concentration change is in the fourth predetermined range, the CPU 54 assumes that the motorbike 100 is disposed in a small garage, and obtains a duration time which matches the obtained amount of methanol concentration change from the fourth table. The duration time obtained from the fourth table is stored in the memory 58 as a fourth duration time. In other words, the fourth duration time is set (Step S25). Thereafter, the process goes to Step S27 for determination.

On the other hand, if the obtained amount of methanol concentration change is smaller than the first threshold value (about 0.5 ppm in the present preferred embodiment), the process skips Step S25 and goes to Step S27 on an assumption that the change is within a range of natural concentration change and the motorbike is not disposed in a garage. If the obtained amount of methanol concentration change is not smaller than the second threshold value (about 4 ppm in the present preferred embodiment), the process goes to Step S27 on an assumption that the obtained amount of methanol concentration change is not correct due to influences from methanol fuel leak from the fuel tank 14 for example. In other words, if the obtained amount of methanol concentration change is out of the fourth predetermined range, the process skips Step S25 and goes to Step S27. If Step S23 determines that the value is not smaller than the second threshold value, there is a potential danger that the fuel tank 14 and/or the aqueous solution tank 16 is damaged. Therefore, the system performs a procedure of notifying the potential danger to the driver, for example, of the motorbike 100 by displaying a predetermined message in the display section 98.

In Step S27, the CPU 54 determines whether or not the amount of output change from the cell stack 12 obtained in Step S9 is not smaller than a first threshold value (about 20 W, for example) and smaller than a second threshold value (about 160 W, for example). In other words, a determination is made whether or not the obtained amount of output change falls in a fifth predetermined range. If the obtained amount of output change is in the fifth predetermined range, the CPU 54 assumes that the motorbike 100 is disposed in a small garage, and obtains a duration time which matches the obtained amount of output change from the fifth table. The duration time obtained from the fifth table is stored in the memory 58 as a fifth duration time. In other words, the fifth duration time is set (Step S29). Thereafter, the process goes to Step S31 for determination.

On the other hand, if the obtained amount of output change is smaller than the first threshold value (for example, about 20 W in the present preferred embodiment), the process skips Step S29 and goes to Step S31 on an assumption that the change is within a range of natural output change and the motorbike is not disposed in a garage. If the obtained amount of output change is not smaller than the second threshold value (160 W in the present preferred embodiment), the process goes to Step S31 on an assumption that the obtained amount of output change is not correct due to detection errors for example, by the voltage detection circuit 66 or the current detection circuit 68. In other words, if the obtained amount of output change is out of the fifth predetermined range, the process skips Step S29 and goes to Step S31. If Step S27 determines that the value is not smaller than the second threshold value, there is a potential failure in the voltage detection circuit 66 and/or the current detection circuit 68. Therefore, the system performs a procedure of notifying the potential failure to the driver, for example, of the motorbike 100 by displaying a predetermined message on the display section 98.

In Step S31, the CPU 54 checks whether or not there are duration times stored in the memory 58. If there is any of the first through the fifth duration times stored in the memory 58, the CPU 54 checks if the system is counting a time on any of the duration times (Step S33). If a duration time counting is not in progress, the CPU 54 selects the shortest one of the duration times stored in the memory 58 (Step S35). It should be noted here that if there is only one of the first through the fifth duration times stored in the memory 58, that one is selected.

Subsequently, based on the clock signal from the clock circuit 56, the CPU 54 starts time counting (measuring) on the duration time which was selected in Step S35 (Step S37). Then, upon the lapse of the duration time in Step S39, the CPU 54 stops the system components such as the aqueous solution pump 24 and the air pump 40, to stop power generation in the cell stack 12 (Step S41). Thereafter, the system displays a predetermined message in the display section 98 for example, to notify the driver, etc., of the motorbike 100 that the power generation was stopped in order to reduce deterioration of the cell stack 12 (Step S43), and then the process comes to an end.

Until Step S39 determines that the duration time has elapsed, the process returns to Step S5 and repeats the routine starting from Step S5 unless Step S45 finds that the main switch 92 has been turned on.

If Step S33 determines that time counting on a duration time is in progress, the process skips Step S35 and S37 and goes to Step S39.

Further, if Step S31 determines that there is no duration time stored in the memory 58, the CPU 54 checks if the system is counting on a duration time (Step S47). Then, if a counting on a duration time is in progress, the CPU 54 stops the counting, and clears all previous duration times stored in the memory 58 (Step S49) and then brings the process to Step S45. In other words, an ongoing time counting will be stopped and the stored duration time settings will be cleared if, for example, the garage doors are now opened and smooth air movement is now provided from the outside into the garage (in case where the space in the garage is no longer a closed space).

It should be noted here that even if the duration time counting is in progress, power generation in the cell stack 12 is stopped if the charge rate of the secondary battery 60 has reached the upper limit value (for example, about 98% in the present preferred embodiment). Likewise, even if the duration time counting is in progress, power generation in the cell stack 12 is forcibly stopped if the stop button 96*b* is pressed.

Additionally, if any one of the sonars 88*a* through 88*e* fails to detect the distance in Step S9, an arrangement will be that the process skips Step S13 on an assumption that the motorbike 100 is not disposed in a garage (or the garage is open to the outside).

So far, description has been made for an arrangement that in the second and later executions of Step S9, values used as the latest detection results are provided by detection results obtained in the latest execution of Step S7 whereas values used as the previous detection results are provided by detection results obtained in the previous execution of Step S7. However, the present invention is not limited to this. For example, the arrangement may be that the second and later executions of Step S9 use the first detection results (detection results in Step S3) and detection results in the latest Step S7 to obtain a value for each amount of change.

Further, the first round of detecting operation for various kinds of information (detections performed in Step S3) may be made before the motorbike 100 shuts down its operation.

It should be noted here that the predetermined time (waiting time) in Step S5 is not limited to one minute mentioned earlier, but may be set to any value. In the case where the predetermined time in Step S5 is set to a value other than one minute, a simple arrangement may be that Step S9 includes calculations to obtain an amount of change per minute for each of the changes. Another arrangement in this case may be to prepare a second through a fifth tables each as a record of a relationship between the duration time and the amount of change per unit time other than one minute.

According to the fuel cell system 10 as described thus far, it is possible to determine whether or not the motorbike 100 is disposed in a garage based on an amount of temperature change, an amount of humidity change and an amount of methanol concentration change in external air (ambient air around the motorbike 100), as well as based on an amount of output change in the cell stack 12. Then, if it is determined that the motorbike is disposed in a garage, it is possible to reduce deterioration of the cell stack 12 by stopping power generation in the cell stack 12 before localized power generation begins in individual fuel cells 18.

Power generation in the cell stack 12 is continued if the amount of temperature change in the external air per predetermined time (for example, approximately one minute in the present preferred embodiment) is smaller than a first threshold value (for example, about 1° C. in the present preferred embodiment) which represents a maximum approximate amount of change presumed for a natural trend of temperature change. This makes it possible to prevent such a problem that power generation in the cell stack 12 is erroneously stopped even if, for example, the motorbike 100 is not disposed in a garage and external air temperature is changing in a natural trend. In other words, the present preferred embodiment of the present invention makes it possible to prevent such a problem that power generation in the cell stack 12 is erroneously stopped under low risk situations where accelerated deterioration is not likely to occur, making it possible to continue to charge the secondary battery 60.

Power generation in the cell stack 12 is continued if the amount of temperature change in the external air per predetermined time is not smaller than a second threshold value (for example, about 4° C. in the present preferred embodiment) which represents a value greater than a maximum amount of change presumed by adjusting the first threshold value with a temperature rise caused by exhaust gas. This makes it possible to prevent such a problem that power generation in the cell stack 12 is erroneously stopped when, for example, the external air temperature is raised sharply by room heating equipment but a net increase in the external air temperature caused by the power generation in the cell stack 12 is small.

Power generation in the cell stack 12 is continued if the amount of humidity change in the external air per predetermined time is smaller than a first threshold value (for example, about 3% RH in the present preferred embodiment) which represents a maximum approximate amount of change presumed for a natural trend of humidity. This makes it possible to prevent such a problem that power generation in the cell stack 12 is erroneously stopped even if external air humidity is changing in a natural trend.

Power generation in the cell stack 12 is continued if the amount of humidity change in the external air per predetermined time is not smaller than the second threshold value (for example, about 20% RH in the present preferred embodiment) which represents a value greater than a maximum amount of change presumed by adjusting the first threshold value with a humidity rise caused by exhaust gas. This makes it possible to prevent such a problem that power generation in the cell stack 12 is erroneously stopped when, for example, the external air humidity is raised sharply by room humidifier equipment but a net increase in the external air humidity caused by power generation in the cell stack 12 is small.

Power generation in the cell stack 12 is continued if the amount of methanol concentration change in the external air per predetermined time is smaller than a first threshold value (for example, about 0.5 ppm in the present preferred embodiment) which represents a maximum approximate amount of change presumed for a natural trend of concentration change. This makes it possible to prevent such a problem that power generation in the cell stack 12 is erroneously stopped even if methanol concentration in the external air is changing in a natural trend.

Power generation in the cell stack 12 is continued if the amount of methanol concentration change per predetermined time is not smaller than a second threshold value (for example, about 4 ppm in the present preferred embodiment) which represents a value greater than a maximum amount of change presumed by adjusting the first threshold value with a methanol concentration rise caused by exhaust gas. This makes it possible to prevent such a problem that power generation in the cell stack 12 is erroneously stopped when, for example, methanol concentration in the external air is raised sharply by methanol fuel leak from the fuel tank 14 or aqueous methanol solution leak from the aqueous solution tank 16 but a net increase in methanol concentration of the external air caused by power generation in the cell stack 12 is small.

Power generation in the cell stack 12 is continued if the amount of output change per predetermined time is smaller than a first threshold value (for example, about 20 W in the present preferred embodiment) which represents a maximum approximate amount of change presumed for a normal trend of output change. This makes it possible to prevent such a problem that power generation in the cell stack 12 is erroneously stopped even if the output from the cell stack 12 is changing in a normal trend.

Power generation in the cell stack 12 is continued if the amount of output change per predetermined time is not smaller than a second threshold value (about 160 W in the present preferred embodiment) which represents a value greater than a maximum amount of change presumed by adjusting the first threshold value with a decrease in the output caused by reduced amount of oxygen inside the garage. This makes it possible to prevent such a problem that power generation in the cell stack 12 is erroneously stopped when, for example, the voltage detection circuit 66 or the current detection circuit 68 has made an erroneous detection indicating a sharp decrease in the output from the cell stack 12, but in reality, there is no such decrease in the output from the cell stack 12 as caused by decrease in the amount of oxygen in the garage by the power generation.

By using change information including the amount of temperature change, the amount of humidity change and the amount of methanol concentration change in the external air as well as the amount of output change in the cell stack 12 together with space information represented by the volume of garage, it is possible to stop power generation in the cell stack 12 appropriately. This makes it possible to reliably reduce deterioration of the cell stack 12 by stopping power generation in cases where the obtained volume of the garage suggests that the motorbike 100 is disposed in a small garage.

By setting first through fifth duration times using the volume of the garage, the amount of temperature change, the amount of humidity change and the amount of methanol concentration change in the external air as well as the amount of output change in the cell stack 12, and then selecting the shortest duration time, it is possible to reduce deterioration of the cell stack 12 more reliably.

When the power source of the fuel cell system 10 is turned off, i.e., when the main switch 92 is turned off, the fuel cell system 10 is often unattended by the user, and it is sometimes impossible to reliably prevent deterioration of the cell stack 12 by simply giving a warning. However, this problem is prevented by stopping power generation in the cell stack 12 based on change information during a time in which the main switch 92 is in an off position. Preferred embodiments of the present invention are particularly effective while the power source is turned off. Also, preferred embodiments of the present invention provide a similar advantage by preventing power generation in the cell stack 12 based on change information during a time in which the fuel cell system 10 is connected with a piece of equipment and a power source of the equipment is in an off position.

Even when it is assumed that the motorbike 100 is disposed in a garage, power generation is continued until the duration time has been elapsed. Thus, it is possible to continue such an operation as charging the secondary battery 60 within a range where there is no risk for accelerated deterioration of the cell stack 12.

When power generation is continued in a garage, humidity in the garage is likely to increase since the fuel cell system 10 uses aqueous methanol solution for its power generation, and the exhaust gas from the fuel cell system 10 contains a high level of water vapor. Also, the exhaust gas from the fuel cell system 10 contains carbon dioxide which is likely to increase the air temperature in the garage, as well as to decrease the output of the cell stack 12. For these reasons, preferred embodiments of the present invention are particularly effective in the fuel cell system 10 in which it is possible to obtain the amount of temperature change, the amount of humidity change and the amount of output change more accurately than in hydrogen fuel cell systems for example.

In large fuel cells, localized power generation and accelerated deterioration caused thereby are likely to occur in association with decrease in the amount of oxygen in the air which is to be used for power generation. Therefore, preferred embodiments of the present invention are suitably applied to the motorbike 100 which requires power supply from the cell stack 12 that includes large fuel cells 18.

Figure 5:
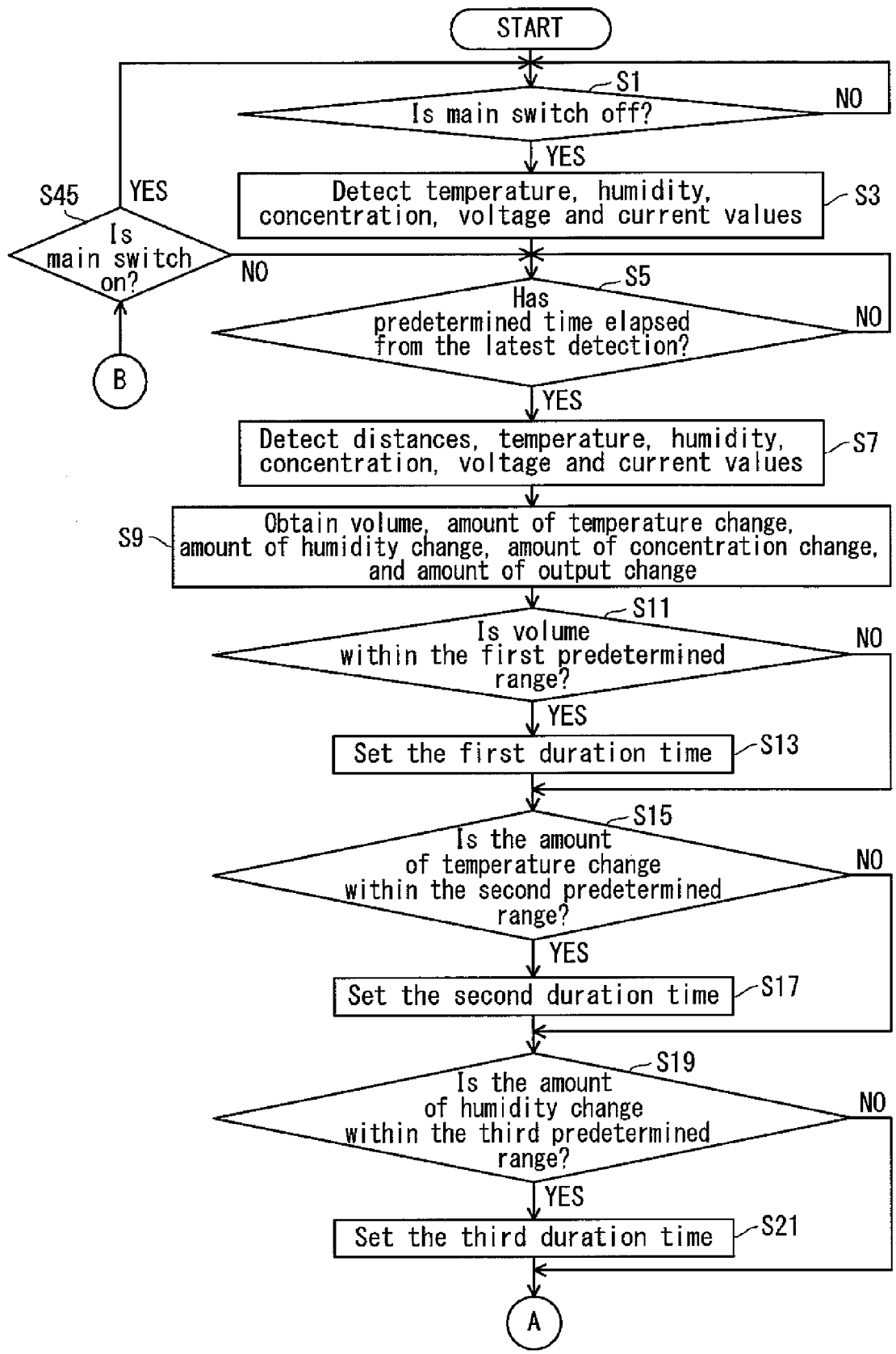
FIG. 5 is a flowchart showing an example of a principal operation in the fuel cell system according to a preferred embodiment of the present invention.
Figure 6:
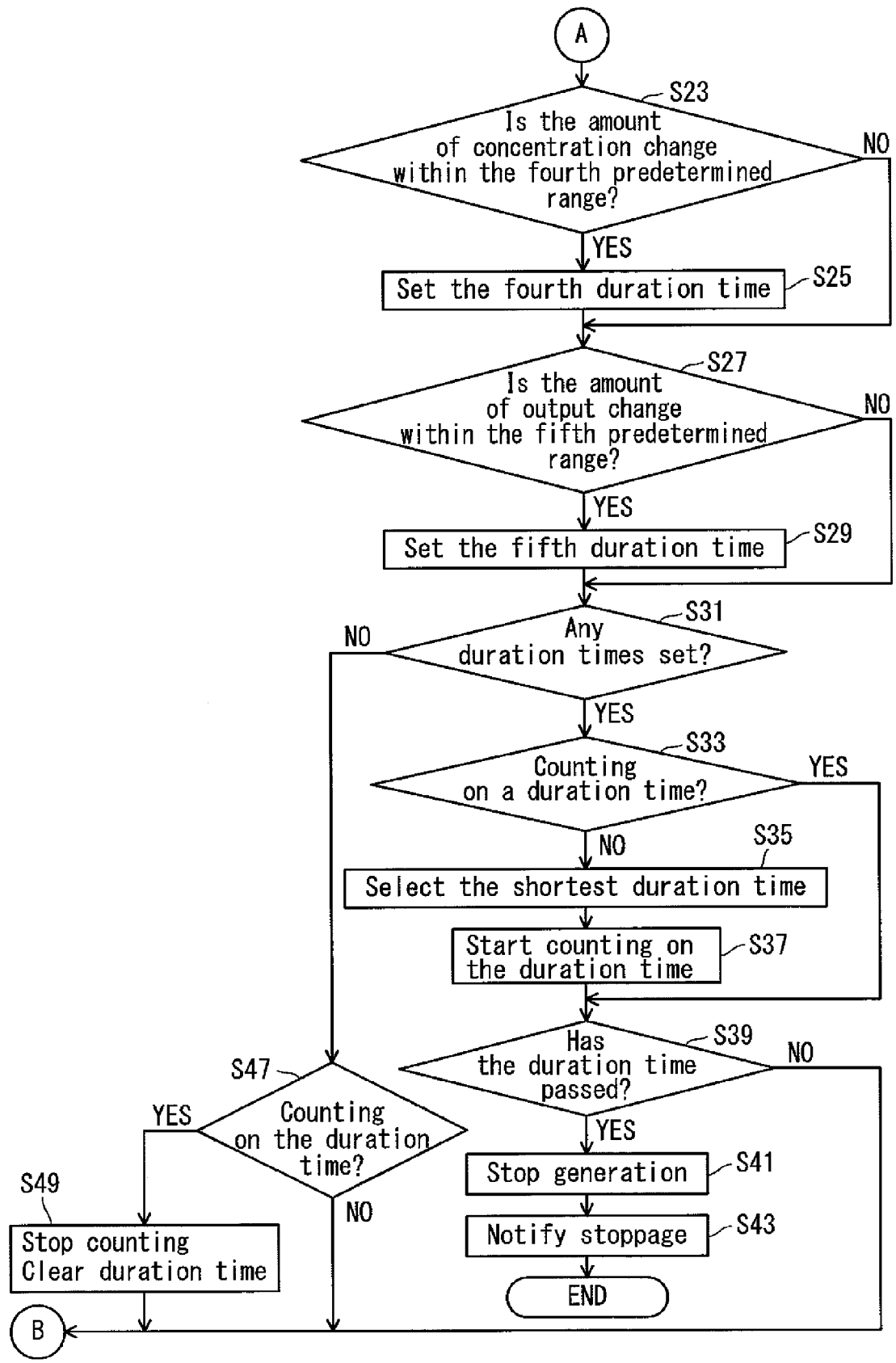
FIG. 6 is a flowchart showing steps which follow the steps in FIG. 5.

It should be noted here that in the operation in FIG. 5, description was made for a case where the process preferably goes to Step S3 when the main switch 92 is turned off. However, the trigger which makes the process to go to Step S3 is not limited to this.

For example, even if the main switch 92 has not been turned off, Step S1 may determine whether or not the fuel cells 18, i.e., the cell stack 12, has started power generation, so that a result of the determination is used as the trigger to execute Step S3.

Also, Step S1 may determine whether or not the fuel cells 18, i.e., the cell stack 12, has shifted to normal operation, so that a result of the determination is used as the trigger to execute Step S3. It is sometimes impossible to obtain accurate change information when the system is not in normal operation. Erroneous determination can be prevented by an arrangement that determination is made only in normal operation.

Whether or not the cell stack 12 has shifted to normal operation can be determined by checking, for example, whether or not the temperature of the fuel cell 18 has become not smaller than a predetermined value (approximately 60° C., for example). The temperature of the fuel cell 18 may be detected by the inlet temperature sensor 28, the outlet temperature sensor 30, etc., which serve as the temperature detector. In this case, it is easy to determine whether or not the cell stack 12 is in normal operation.

Whether or not the cell stack 12 has shifted to normal operation can also be determined by checking information regarding the output of the fuel cells 18, i.e., by checking if the information has a value not smaller than a predetermined value. The information regarding the output of the fuel cells 18 may be provided by an output value of the cell stack 12 or an output value per one fuel cell 18. Whichever value is used, the value is compared to a predetermined counterpart value. In this case, again, it is easy to determine whether or not the cell stack 12 is in normal operation.

Further, whether or not the cell stack 12 has shifted to normal operation may be determined by checking if an amount of time elapsed from a start of power generation has become not smaller than a predetermined value.

Other applicable arrangements include that the process moves to Step S3 based on information from the meter 116 regarding the status of the electric motor 112. Specifically, a ground speed of the motorbike 100 is detected based on the number of revolutions of the electric motor 112, and the process goes to Step S3 if the ground speed continues to be zero for a predetermined amount of time.

Further, a tilt detector such as a gyro-sensor for detecting a tilt of the motorbike 100 may preferably be used. In this case, an arrangement may be that the process goes to Step S3 if the tilt detector continues to detect a tilted state of the motorbike 10 indicating that the motorbike 10 is resting on supporting device such as a stand for a predetermined amount of time.

In the preferred embodiment described above, duration time counting is performed if there is at least one setting out of the first through the fifth duration times. However, duration time counting may be performed only if settings are made for all of the first through the fifth duration times. This makes it possible to prevent erroneous stoppage of power generation when the motorbike is not actually disposed in a closed space. Additionally, it is not necessary to perform duration time counting. In other words, power generation may be stopped right away if a setting is made for any one of the duration time. This prevents deterioration of the fuel cells 18, i.e., of the cell stack 12, more reliably. As another option, power generation may be stopped right away if setting is made for all of the duration times.

In the operation in FIG. 5, description was made for a case where the fourth duration time is set by using a methanol concentration in the external air detected by the concentration detector which is provided by the concentration sensor 86. In place of this arrangement, the fourth duration time may be set by using a methyl formate concentration, formaldehyde concentration, or an oxygen concentration in the external air.

The second table described earlier may include a plurality of tables for different external air temperature values, output values of the fuel cells 18, or temperature values of the fuel cells 18. This arrangement is advantageous because change in external air temperature, in output or in cell stack temperature will change determination references for the space volume. For the same reason, the first and the second threshold values may be varied in accordance with external air temperature values, output values of the fuel cells 18 or temperature values of the fuel cells 18. In this case, it is possible to have a more accurate estimation on the volume of the space by using different tables depending on results of measurements on the external air temperature, output of the fuel cells 18 or temperature of the fuel cells 18.

The third table described earlier may include a plurality of tables for different external air humidity values. In this case, it is possible to have a more accurate estimation on the volume of the space by using different tables depending on a result of measurement on external air humidity.

The fifth table described earlier may include a plurality of tables for different output values of the cell stack 12 or output values (air flow) of the air pump 40. In this case, it is possible to have a more accurate estimation on the volume of the space by using different tables depending on current results of measurements made to the output or to the flow.

In the preferred embodiment described above, description was made for a case where detection is preferably performed for the amount of temperature change, the amount of humidity change and the amount of methanol concentration change in the air (external air) around the motorbike 100, i.e., around the fuel cell system 10. However, the present invention is not limited by this. For example, as change information of air utilized in power generation in the cell stack 12, temperature change information, humidity change information and methanol concentration change information may be obtained from the air which is present inside the fuel cell system 10 and in the route to the air supply device which is provided by the air pump 40.

Also, in the preferred embodiment described above, description was made for a case which preferably utilizes space information obtaining device including the sonars 88a through 88e provided by active sonars. However, space information obtaining device is not limited to these. For example, in place of the sonars 88a through 88e, space information obtaining device may be provided by laser scanners which detect the distance to an object by applying a laser beam from an LED for example, and receiving a reflected beam by a CCD for example. Cameras which use infra-red beams to detect the distance to an object may also be used instead of the laser scanners.

Further, in the preferred embodiment described above, detection was preferably made for a volume of the garage (size of the closed space), an amount of temperature change, an amount of humidity change and an amount of methanol concentration change in the external air as well as an amount of output change in the cell stack 12. However, the present invention is not limited by this. For example, the arrangement may be that at least one of temperature change information and humidity change information in the external air and output change information of the cell stack 12 is obtained and power generation in the cell stack 12 is stopped based on the obtained change information.

A closed space is not limited to a garage, but means any space having poor air exchange with the outside.

In the preferred embodiment described above, the amount of output change in the fuel cell is represented by the amount of output change in the cell stack 12. Obviously, however, the amount of output change in the fuel cell may be represented by the amount of output change per one fuel cell 18.

It should be noted here that a fuel cell system according to various preferred embodiments of the present invention is applicable suitably not only to motorbikes but also to any transportation equipment such as automobile, marine vessels, etc. Further, a fuel cell system according to various preferred embodiments of the present invention is applicable suitably to electronic equipment such as personal computers (PCs), mobile telephones, etc. For example, when a fuel cell system according to a preferred embodiment of the present invention is used in a laptop (portable) PC, Step S1 in FIG. 5 may have an arrangement that a gyro sensor detects a tilt of the PC or an open/close state of the display screen so that the system determines the state of operation of the PC.

In the preferred embodiment described above, description was made for a case where aqueous methanol solution which contains methanol as an example of alcohol is used as the fuel. However, the fuel is not limited to this. For example, the fuel may be provided by aqueous ethanol solution which contains ethanol as another example of alcohol. Further, the fuel is not limited to alcohol fuel, but may be provided by ether fuels such as dimethyl ether which contains ether.

The present invention being thus far described in terms of preferred embodiments, the preferred embodiments clearly may be varied in many ways within the scope of and the spirit of the present invention. The scope of the present invention is only limited the accompanied claims.

What is claimed is:

1. A fuel cell system comprising:
   a fuel cell arranged to generate electric power using a fuel and air containing an oxidizer;
   a change information obtaining device programmed to obtain at least one amount of change information from an amount of temperature change information of the air used in power generation of the fuel cell, an amount of humidity change information of the air, and an amount of output change information of the fuel cell; and
   a control device programmed to stop the power generation in the fuel cell based on the amount of change information obtained by the change information obtaining device; wherein
   the air is air external to the fuel cell system or present inside the fuel cell system;
   the amount of output change information includes information regarding an amount of change in voltage of the fuel cell or an amount of change in current of the fuel cell;
   the control device is programmed to stop the power generation in the fuel cell if the amount of change is not smaller than a predetermined first threshold value; and
   the change information obtaining device obtains the at least one amount of change information by determining an amount of difference in temperature, humidity, or output between a latest detection result and a previous detection result.

2. The fuel cell system according to claim 1, wherein the change information obtaining device is programmed to obtain at least one of an amount of temperature change in the air per predetermined time as the amount of temperature change information, an amount of humidity change in the air per predetermined time as the amount of humidity change information, and an amount of output change in the fuel cell per predetermined time as the amount of output change information.

3. The fuel cell system according to claim 1, wherein the control device is programmed to stop the power generation in the fuel cell if the amount of change is not smaller than the predetermined first threshold value and is smaller than a predetermined second threshold value which is greater than the predetermined first threshold value.

4. The fuel cell system according to claim 1, further comprising a setting device programmed to set a duration time for continued power generation in the fuel cell based on the amount of change information, wherein the control device is programmed to stop the power generation in the fuel cell upon a lapse of the duration time set by the setting device.

5. A fuel cell system comprising:
- a fuel cell arranged to generate electric power using a fuel and air containing an oxidizer;
- a change information obtaining device programmed to obtain at least one amount of change information from an amount of temperature change information of the air used in power generation of the fuel cell, an amount of humidity change information of the air, and an amount of output change information of the fuel cell; and
- a control device programmed to stop the power generation in the fuel cell based on the amount of change information obtained by the change information obtaining device; wherein
- the air is air external to the fuel cell system or present inside the fuel cell system;
- the amount of output change information includes information regarding an amount of change in voltage of the fuel cell or an amount of change in current of the fuel cell; and
- the fuel cell system further comprises a space information obtaining device programmed to obtain space information regarding a size of a space where the fuel cell system is disposed, wherein the control device is programmed to stop the power generation in the fuel cell based on the amount of change information or the space information.

6. The fuel cell system according to claim 1, wherein the control device is programmed to stop the power generation in the fuel cell based on the amount of change information while an electric power source of the fuel cell system or an equipment to which the fuel cell system is connected is in an off state.

7. The fuel cell system according to claim 1, wherein the control device is programmed to stop the power generation in the fuel cell based on the amount of change information while the fuel cell is in a normal operation.

8. The fuel cell system according to claim 1, further comprising a temperature detector arranged to detect information regarding a temperature of the fuel cell, wherein the control device is programmed to stop the power generation in the fuel cell based on the amount of change information when a detection result of the temperature detector is not smaller than a predetermined value.

9. The fuel cell system according to claim 1, further comprising an output detector arranged to detect voltage, current, or power information regarding an output of the fuel cell, wherein the control device is programmed to stop the power generation in the fuel cell based on the amount of change information when a detection result of the output detector is not smaller than a predetermined value.

10. The fuel cell system according to claim 1, wherein the fuel includes alcohol or ether.

11. Transportation equipment comprising the fuel cell system according to claim 1.

12. The fuel cell system according to claim 1, wherein the control device stops the power generation in the fuel cell when the amount of change information obtained by the change information obtaining device is greater than a predetermined minimum amount of change.

* * * * *